April 15, 1969   E. TURNER   3,438,360
ENGINE CAMSHAFT CHAIN DRIVE
Filed March 27, 1967
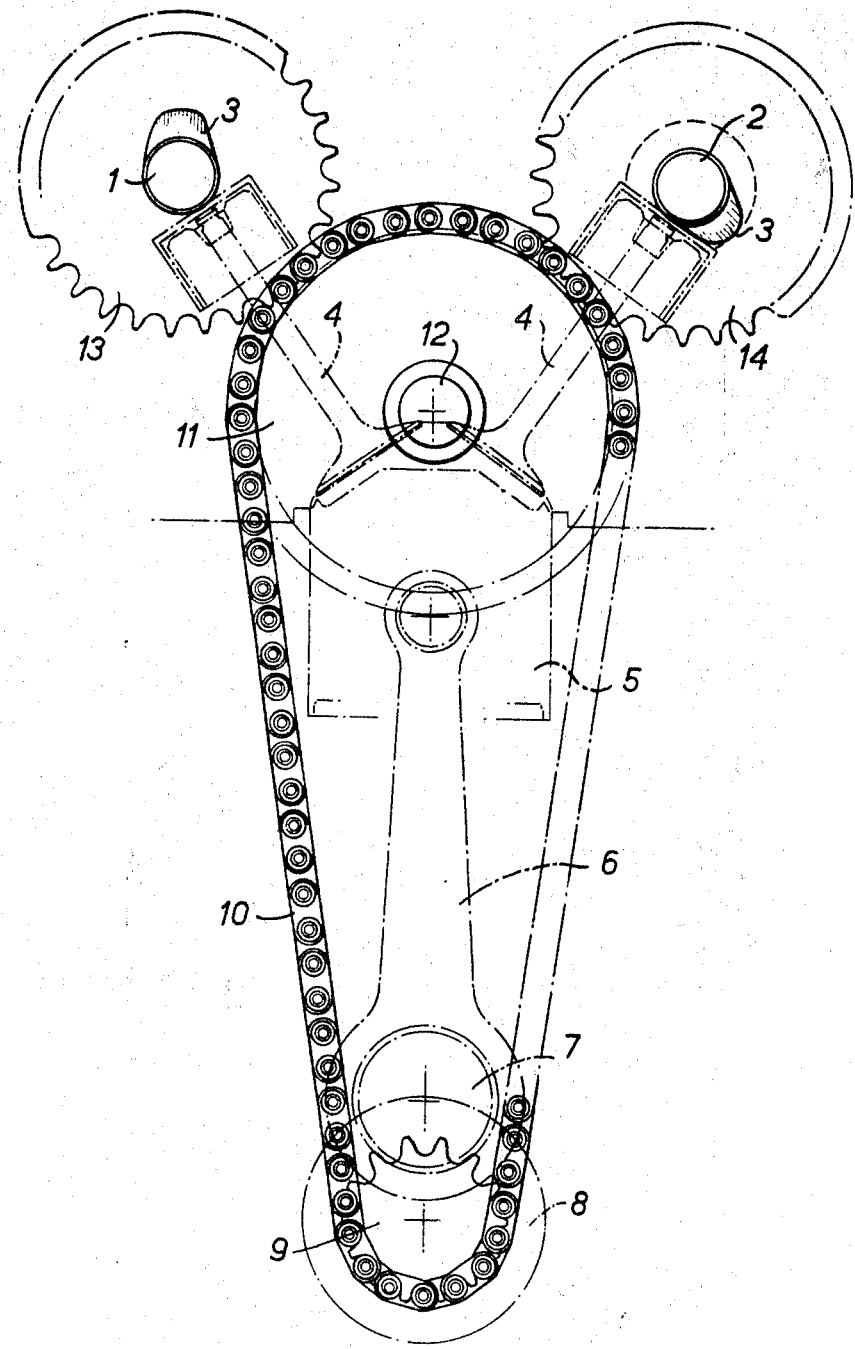

United States Patent Office 3,438,360
Patented Apr. 15, 1969

3,438,360
ENGINE CAMSHAFT CHAIN DRIVE
Edward Turner, Coventry, England, assignor to Edward Turner Engineering Developments Ltd., Birmingham, England, a British company
Filed Mar. 27, 1967, Ser. No. 626,169
Int. Cl. F01l 1/44
U.S. Cl. 123—90     4 Claims

ABSTRACT OF THE DISCLOSURE

In a reciprocating internal combustion engine with at least one overhead camshaft and a chain drive to it, the chain passes over an idler on the cylinder block near the cylinder head and the outside of the chain is engaged by a sprocket on the camshaft, so that the cylinder head, complete with camshaft, can be detached without disturbing the chain.

---

This invention relates to a chain drive 4 driving an overhead camshaft or camshafts in reciprocating internal combustion engines.

The normal chain drive comprises a sprocket on the driving shaft, and a sprocket on the driven shaft with a chain passing around both of them. Sometimes, as where further auxiliary drives are required in internal combustion engines, there may be a further driven sprocket, with the chain following a triangular path. It is also known to drive auxiliaries from a sprocket engaging the back of the chain. A drawback of all such chain drives, has, however, been that the chain, or at least the driven sprocket, has to be detached if the driven shaft (or the structure carrying it) has to be removed. This is particularly troublesome where the driven shaft is an overhead camshaft as it means that the chain has to be removed, upsetting the valve timing, every time the cylinder head is lifted. It has often led designers to avoid chains and employ instead a train of spur gears even though these are noisier, more expensive, and have greater inertia.

It is an aim of the invention to overcome this drawback of known chain drives. According to the invention there is provided a chain or toothed belt drive including a toothless idler in which drive is transmitted to and/or from the belt or chain by a toothed sprocket engaging the outside of the belt or chain at a point in the arc where it passes over that idler.

The great advantage of such a layout is that the cylinder head, complete with camshaft, can be lifted off without disturbing the chain. In fact the sprockets of twin overhead camshafts can engage the chain at angularly spaced points around the same idler.

The invention will now be further described by way of example with reference to the accompanying drawing, which illustrates the application of the invention to the driving of twin overhead camshafts in a reciprocating internal combustion engine.

In the drawing, the two overhead camshafts are shown at 1 and 2; through inverted-cup tappets the cams 3 which they carry act on valves 4 in a cylinder with piston 5 linked by connecting rod 6 to a crankpin 7 on a crankshaft 8. These parts are shown in broken lines as they do not form part of the invention. The camshafts are carried in a cylinder head which is detachable from the cylinder block and crankcase assembly that carries the crankshaft.

On the crankshaft 8 there is mounted a sprocket 9, and over it passes a roller chain 10 of a well-known kind which may be single or duplex. The upper part of the chain passes an idler 11, which is a plain, toothless idler moulded from synthetic resin and with its periphery made of neoprene. The surface of this periphery may be plain (i.e. cylindrical) or it could be slightly crowned or even may be channel-shaped in cross-section to guide the chain. The idler 11 is carried on a stub shaft 12 on the upper part of the cylinder block (not shown) of the engine, and it can be of any convenient diameter as its diameter does not affect the drive ratio.

The camshafts 1 and 2 carry toothed sprockets 13 and 14 which engage the outside of the chain at spaced points on its arc of contact with the idler 11. Their tooth form is preferably of modified shape to allow for the fact that they are engaging the convexly curved outside of the chain instead of the normal arrangement of a sprocket embraced by a chain. The necessary two-to-one speed reduction between the crankshaft and the camshafts is achieved by making each sprocket 13 and 14 double the diameter of the crankshaft sprocket 9. The sprockets 13 and 14 can have the usual vernier timing adjustment in relation to the camshafts. It will be understood that the cylinder head, complete with camshafts and sprockets, can be lifted clear without disturbing the chain or the idler. Co-operating marks on the chain links and the sprockets prevent the timing being lost when removing and replacing the head.

In a modification a single overhead camshaft could be driven in a similar manner. The drive at the input end of the chain instead of or in addition to the output end could be transmitted by a sprocket engaging the outside of the chain where it passes over a suitably placed idler.

Although I have described the member 12 as an idler, and it transmits no driving torque to the camshafts, it might be possible for it to be used to transmit a subsidiary drive, for example it could carry a fan or it could carry a pulley transmitting a drive to a fan or to a dynamo, but it would be an idler as far as the drive to the camshafts is concerned.

Where I have referred to chain drives above this term is to be understood as including other positive forms of flexible transmission member, such as the toothed rubber or synthetic resin belt now being used in some situations in place of roller chains. Teeth would be provided on the outside as well as the inside of the belt to enable the invention to be applied in the manner described above, although if both the driving and the driven sprocket engage the outside of the belt the teeth on the inside could be omitted.

I claim:
1. In a camshaft drive for actuating the valves of an overhead valve reciprocating internal combustion engine, a cylinder block/crankcase assembly, a crankshaft rotatably mounted in said assembly, a sprocket rotatably driven from said crankshaft, an idler mounted rotatably on said assembly, an endless flexible toothed member passing around said sprocket and said idler, a cylinder head detachably mounted on said assembly adjacent said idler, a valve-operating camshaft rotatably mounted in said cylinder head, and a second sprocket, said second sprocket being secured to said camshaft and being in driving en- gagement with a convex portion of said flexible toothed member in the region of said member that passes around said idler.

2. A camshaft drive as set forth in claim 1 including a second valve-operating camshaft rotatably mounted in said cylinder head, and a further sprocket, said further sprocket being secured to said second camshaft and being in driving engagement with a convex portion of said flexible toothed member in said region but angularly spaced from the point of engagement of said second sprocket.

3. A camshaft drive as set forth in claim 1 wherein said idler is toothless.

4. A camshaft as set forth in claim 2 wherein said idler is toothless.

References Cited

UNITED STATES PATENTS

| | | | |
|---|---|---|---|
| 470,927 | 3/1892 | Edison | 74—221 |
| 582,208 | 5/1897 | Jennings | 74—221 |
| 2,894,405 | 7/1959 | Carle. | |
| 3,338,229 | 8/1967 | De Lorean et al. | |
| 3,361,000 | 1/1968 | Buchwald. | |

FOREIGN PATENTS 3,047    1876    Great Britain.

WENDELL E. BURNS, *Primary Examiner.*

U.S. Cl. X.R.

74—221; 123—195